United States Patent
Al Qanaei (10) Patent No.: US 8,899,364 B1
(45) Date of Patent: Dec. 2, 2014

(54) ARTICULATED OFF-ROAD VEHICLE

(71) Applicant: Ahmad A. M. J. J. Al Qanaei, Salwaa (KW)

(72) Inventor: Ahmad A. M. J. J. Al Qanaei, Salwaa (KW)

(*) Notice: Subject to any disclaimer, the term of this patent is extended or adjusted under 35 U.S.C. 154(b) by 0 days.

(21) Appl. No.: 14/289,629

(22) Filed: May 28, 2014

(51) Int. Cl.
*B62D 27/04* (2006.01)
*B62D 21/18* (2006.01)

(52) U.S. Cl.
CPC .............. *B62D 27/04* (2013.01); *B62D 21/183* (2013.01); *B60G 2300/07* (2013.01)
USPC ......................................... 180/89.1; 280/400

(58) Field of Classification Search
CPC .............. B60G 13/02; B60G 2300/07; B60G 2204/128; B62D 21/183; B62D 27/04
USPC ............................ 180/89.1, 235, 418; 280/400
See application file for complete search history.

(56) References Cited

U.S. PATENT DOCUMENTS

| | | | |
|---|---|---|---|
| 2,248,921 A | 7/1941 | Casner | |
| 2,370,866 A | 3/1945 | Lewis | |
| 2,939,721 A | 6/1960 | Smith et al. | |
| 3,161,172 A | 12/1964 | Kassbohrer | |
| 3,254,734 A * | 6/1966 | Behrmann | 180/19.1 |
| 3,351,037 A * | 11/1967 | Meili | 440/12.66 |
| 3,547,426 A | 12/1970 | Hart et al. | |
| 3,703,216 A * | 11/1972 | Thibodeau | 180/24.02 |
| 4,022,290 A | 5/1977 | Boyer | |
| 4,466,633 A | 8/1984 | Henley | |
| 4,964,480 A * | 10/1990 | Kopczynski | 180/22 |
| 5,630,607 A | 5/1997 | Yancer | |
| 7,513,516 B2 * | 4/2009 | Ryan | 280/124.109 |
| 7,753,179 B2 * | 7/2010 | Robertson | 188/266 |
| 2004/0129489 A1 * | 7/2004 | Brasseal et al. | 180/350 |

* cited by examiner

*Primary Examiner* — Ruth Ilan
*Assistant Examiner* — Timothy Wilhelm
(74) *Attorney, Agent, or Firm* — Richard C Litman (57) ABSTRACT

The articulated off-road vehicle includes a pivotable chassis and an upper frame extending from the pivotable chassis. Wheels, an engine, and a steering assembly are coupled to the chassis, and the upper frame defines a compartment for drivers and passengers. The pivotable chassis is divided into a front chassis section and a rear chassis section, and a hinge joint pivotally connects the front chassis section to the rear chassis section. A front suspension assembly having a pair of shock absorbers respectively extending at an angle between the top corners of the upper frame and the front chassis section with the shock absorbers pivotally mounted to the upper frame and the front chassis section. Pivotal movement of the front chassis section and concurrent absorption of impact can substantially reduce impact forces imparted to the driver while traversing rough terrain as can thereby increasing safety and comfort for the driver.

14 Claims, 7 Drawing Sheets

ARTICULATED OFF-ROAD VEHICLE

BACKGROUND OF THE INVENTION

1. Field of the Invention

The present invention relates to vehicle systems, and particularly to an articulated off-road vehicle with an improved shock absorbing configuration to enhance safer and smoother operation through rough terrain.

2. Description of the Related Art

Many conventional off-road vehicles are usually those used for personal entertainment such as ATVs (all-terrain vehicles) and dune buggies. Other off-road vehicles are typically employed in military and emergency agencies, and they are typically designed with a range of specific capabilities in support of those agency duties in addition to being able to traverse various terrain.

The off-road capabilities of the above vehicles usually stem from a combination of suspension design and tires. These types of suspension designs can normally increase travel and reinforce the damping characteristics to facilitate easier traversal over uneven dips and rises in the path of the moving vehicle. As a corollary to the increased travel distance of the suspension, some of the steering components can also require modifications to accommodate the longer travel. Tire design can also contribute to how well vehicles perform off-road and typically depends on the specific terrain. In this regard, certain tread patterns and tire compositions perform better in certain types of terrain. For example, tires with stubby or knobby tread patterns are generally more suited to rocky or rough type terrains compared to the relatively smooth tread pattern of a typical, personal passenger vehicle designed for relatively smooth and comfortable travel over relatively smooth roads.

While the above described off-road vehicles function relatively well for off-road vehicle design, they are generally based on a relatively solid or rigid vehicle frame, i.e. a non-articulating frame. Most conventional frames for vehicles include a framework of beams that, to a large extent, do not include parts that move independently of the other, generally to provide the required or desired load bearing and stability characteristics. Some flexibility can be included or exists, but that is typically a result of intentional or inherent material characteristics of the beams that form the frame. Consequently, many of the impact forces experienced by an off-road vehicle are primarily relieved by the suspension, which, at times, can jar the driver, as well as jar a passenger. In some extreme instances, such impacts can be detrimental to the vehicle.

For example, when a sand/dune buggy, a type of off-road vehicle, jumps over a dune at typically a relatively fast speed, the landing impact can be so jarring that it can potentially cause or increase the likelihood of a whiplash effect on the driver or passenger. As noted, the suspension is designed to absorb various impacts, but only to its designed extent. To the extent an impact, or a jarring effect of an impact, is not absorbed, what remains of the impact or its jarring effect typically dissipates through the remainder of the vehicle frame and to the passengers therein. In this regard, the magnitude of energy transfer forces resulting from the impact or its jarring effect can be unconformable or harmful to the occupants of the vehicle.

Vehicles with articulating frames are known, but such vehicles with articulating frames tend to be relatively limited in use. For example, the space industry uses vehicles with articulated frames. However, such space industry vehicles are typically designed to move in low gravity environments and at very slow speeds. Another area where vehicles with articulating frames are used includes agriculture, but again these agricultural type vehicles typically involve vehicles moving at relatively slow speeds. Moreover, the impact forces experienced by and dissipated by these known, articulating frame type vehicles that move at relatively low speeds likely would not be of an extent experienced by off road vehicles that move at relatively faster speeds, such as dune buggies or similar type off-road vehicles.

For individuals who enjoy or employ off-road type vehicles, it would be beneficial to operate off-road type vehicles with relative safety and at a greater range of speeds, particularly operating at relatively fast speeds, over rough terrain while enhancing a reduction of energy transfer forces resulting from an impact or its jarring effect that can be unconformable or possibly harmful to the occupants of the vehicle.

Thus, an articulated off-road vehicle addressing the aforementioned problems is desired.

SUMMARY OF THE INVENTION

Embodiments of an articulated off-road vehicle include a frame assembly that includes a pivotable chassis and an upper frame extending from the pivotable chassis. Wheels, an engine, and a steering assembly are coupled to the chassis, and the upper frame defines a compartment for drivers and passengers. The pivotable chassis is divided into a front chassis section and a rear chassis section, and at least one hinge joint pivotally connects the front chassis section to the rear chassis section. A front suspension assembly having a pair of shock absorbers extending at an angle between the top corners of the upper frame and the front chassis section with the shock absorbers pivotally mounted to the upper frame and the front chassis section. Pivotal movement of the front chassis section and concurrent absorption of impact by the front suspension assembly can enable substantially reduced impact forces imparted to the driver or occupant of the vehicle, such as while traversing rough terrain, as can enhance increasing safety and comfort for the driver or occupant of the vehicle.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
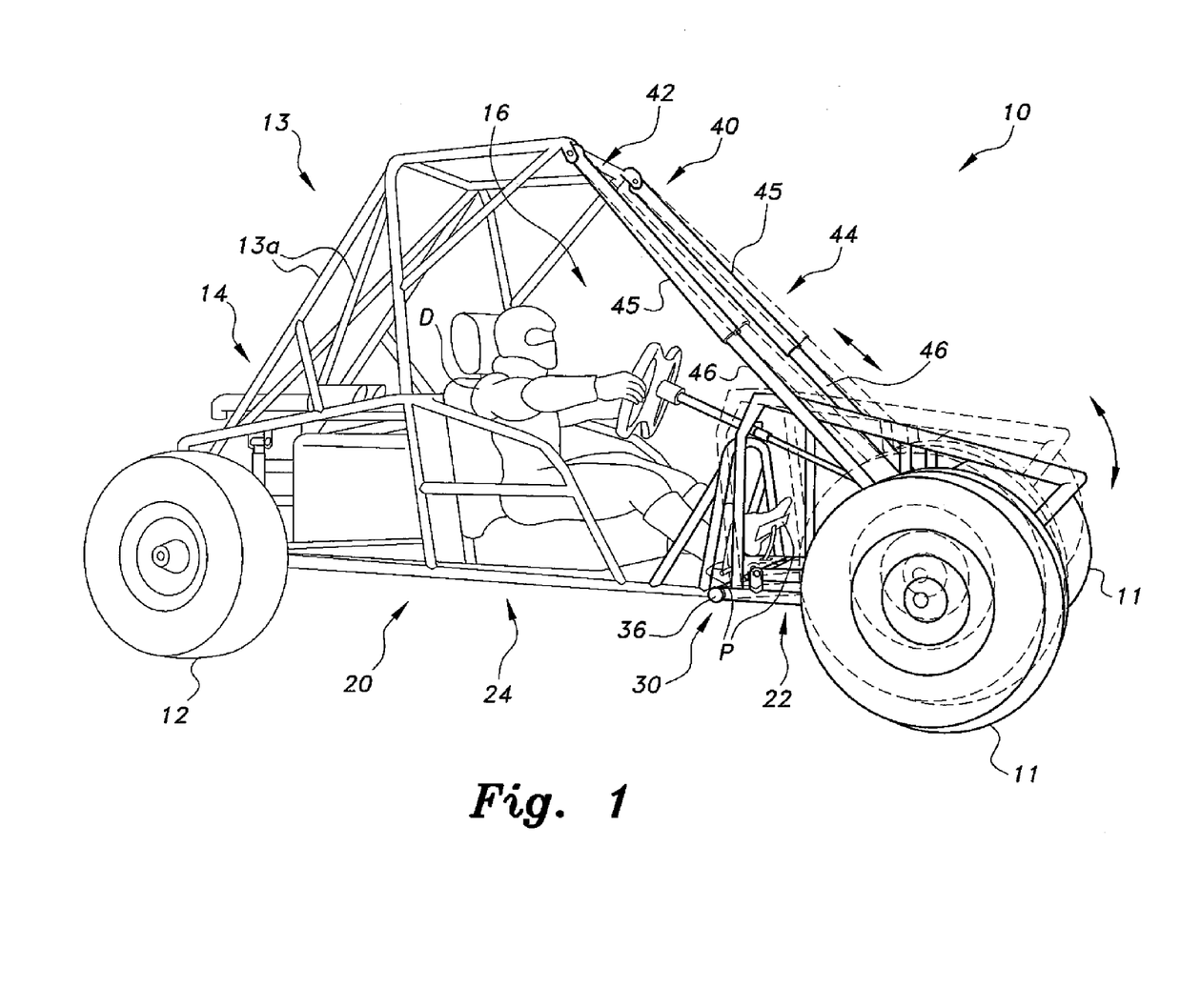
FIG. 1 is an environmental, perspective view of an embodiment of an articulated off-road vehicle according to the present invention.
Figure 3:
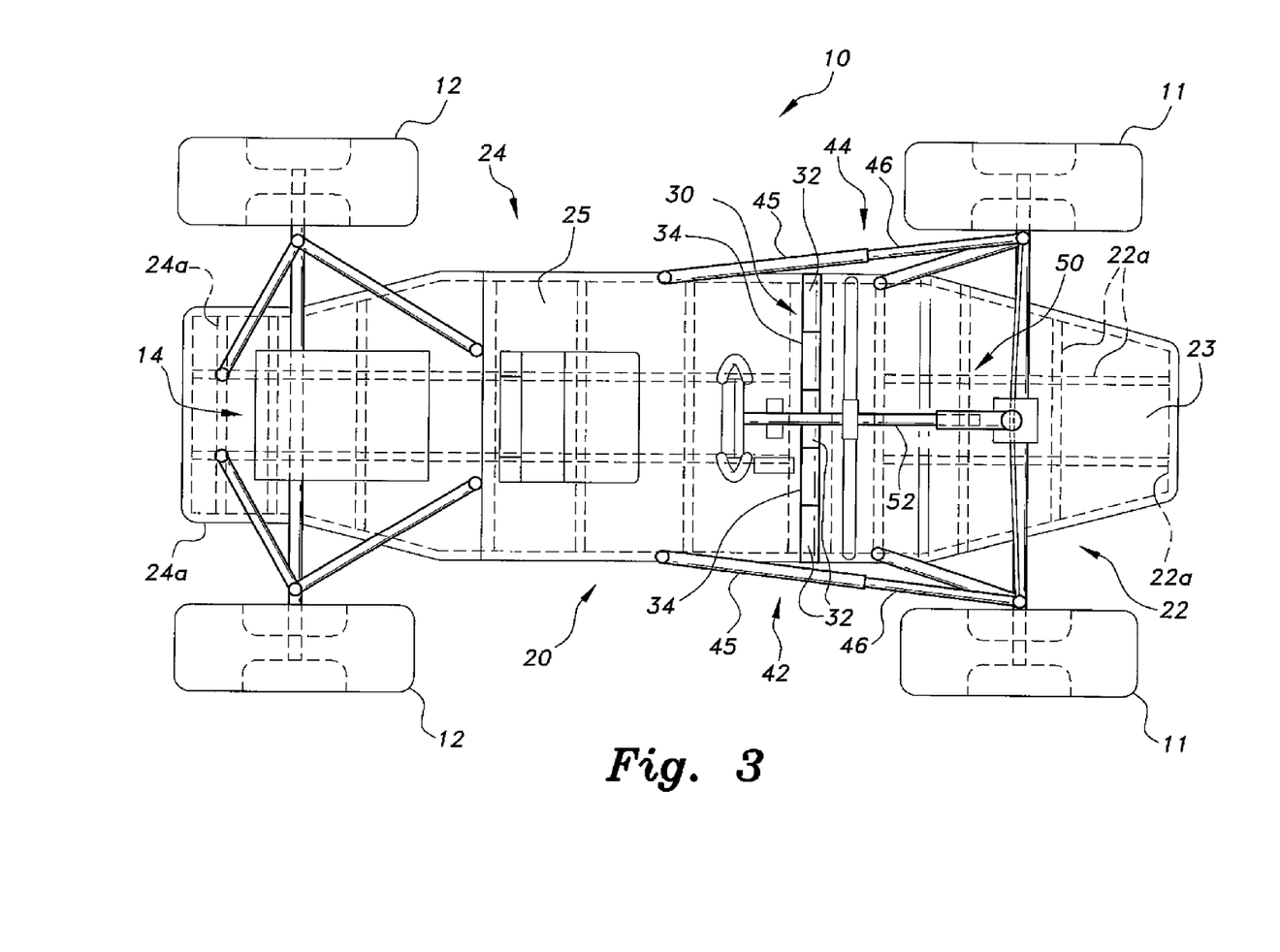
FIG. 3 is a top plan view of an embodiment of the articulated off-road vehicle shown in FIG. 1 with a portion of the upper frame removed to illustrate an embodiment of the chassis according to the present invention.
Figure 5:
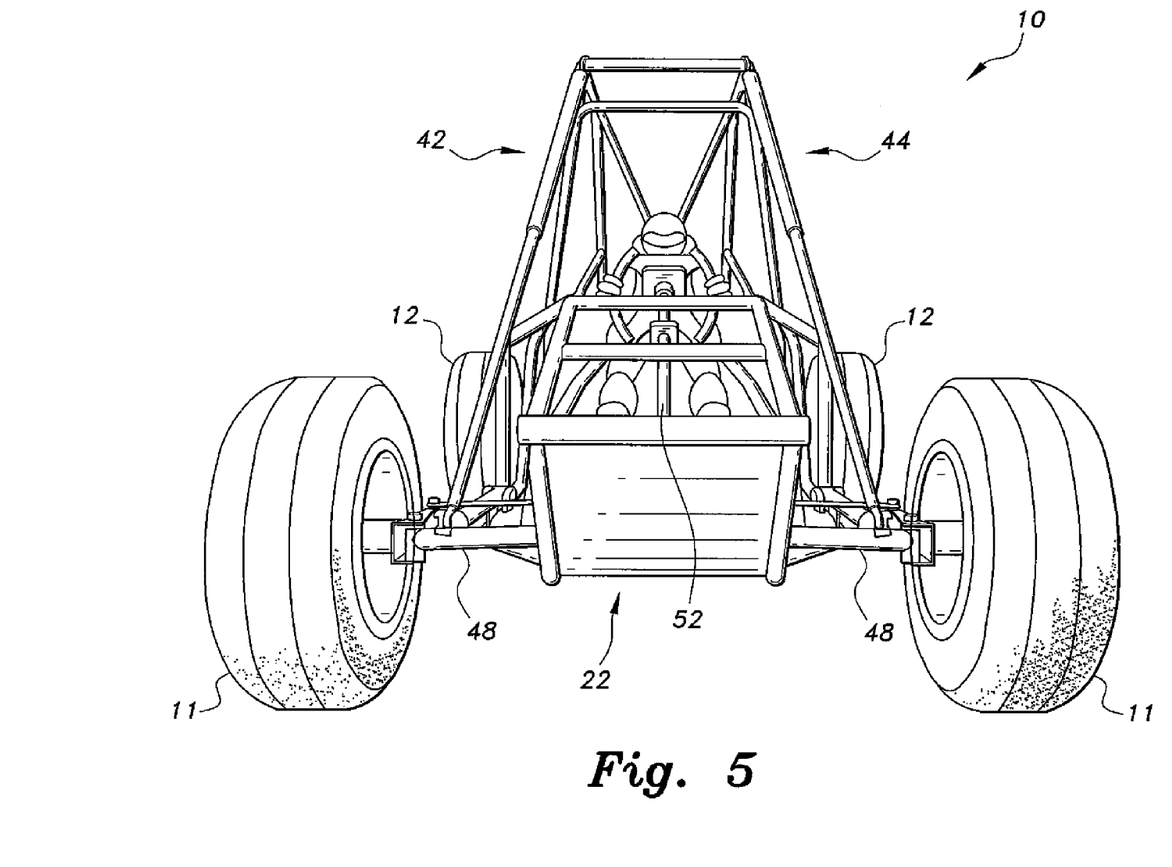
FIG. 5 is front perspective view of an embodiment of the articulated off-road vehicle shown in FIG. 1 according to the present invention.

The articulated off-road vehicle, generally referred to by the reference number 10 in the drawings, can provide synergistic dampening of impact forces to enhance improving the safety and comfort of drivers and passengers while traversing rough terrain. As best seen in FIGS. 1, 3, and 5, the articulated off-road vehicle 10 includes a pivotable chassis 20, at least one front wheel 11, at least one rear wheel 12, an upper frame 13 extending from the chassis 20, and a front suspension assembly 40 pivotally mounted between the front of the pivotable chassis 20 near the front wheels 11 and the upper frame 13. The upper frame 13 includes a plurality of bars or beams 13a that form a lattice to house or support an engine 14 and a passenger compartment 16. The lattice over the passenger compartment 16 can also function as a roll cage, for example.

Unlike most conventional vehicle chassis, the pivotable chassis 20 of the articulated off-road vehicle 10 includes at least one pivotable type joint, such as a hinge joint 30, between a front chassis section 22 and a back or rear chassis section 24. The front chassis section 22 is desirably at least about one third the length of the overall chassis 20, for example. However, the front chassis section 22 can constitute other fractional amounts of the length of the overall chassis 20, depending on the use or application, and should not be construed in a limiting sense. The front chassis section 22 typically provides space for at least a portion of the steering assembly mechanism 50 and for placement of the front wheels 11. In this regard, it is contemplated that the front chassis section 22 can be of various suitable fractional lengths of the total length of the pivotable chassis 20. For example, the length the front chassis section 22 desirably is of a length to accommodate the one or more front wheels 11 and also at least a portion of the steering components associated with the one or more front wheels 11. The remainder length of the pivotable chassis 20 defines the rear chassis section 24, for example. The rear chassis section 24 typically can provide room for at least the engine 14, rear wheels 12, and the occupants, e.g., driver D and/or passengers or occupants of the articulated off-road vehicle 10.

The frame for the chassis 20 is desirably constructed from tubular bars 22a and 24a as can be made with or formed of a lightweight yet durable metal, such as aluminum. It is to be understood, however, that other various suitable materials, such as steel, carbon fiber, fiberglass, polymers, wood, and combinations thereof, can be used to form the chassis 20, for example. Moreover, the tubular bars 22a and 24a can be constructed from and in other beam-shapes, such as I-beams, C-beams, and the like, such as depending on the use or application, and should not be construed in a limiting sense. When the articulated off-road vehicle 10 is assembled, a front floor 23 covers the front chassis section 22 and a rear floor 25 covers the rear chassis section 24.

The at least one hinge joint 30 desirably includes a front knuckle 32 intermeshed with a rear knuckle 34, although other suitable types of hinge or pivotable type joints can be used as, for example, a ball and socket type joint or a yoke type joint, as can depend on the use or application, and should not be construed in a limiting sense. The front knuckle 32 and the rear knuckle 34 can be formed by a curved or curled loop at one end of the front floor 23 and the rear floor 25, respectively, for example. An elongate hinge pin 36 extends through the intermeshed front knuckle 32 and the rear knuckle 34, and the hinge pin 36 is desirably capped, or otherwise restricted, at opposite ends to prevent the hinge pin 36 from sliding out of engagement within the front knuckle 32 and the rear knuckle 34. The tubular bars 22a and 24a at the at least one hinge joint 30 provide or assist in providing pivotal support to the ends of the hinge pin 36. The at least one hinge joint 30 allows the front chassis section 22 and the rear chassis section 24 to pivot freely with respect to each other.

The freely pivotable functionality of the at least one hinge joint 30 that allows the front chassis section 22 and the rear chassis section 24 to pivot freely with respect to each other, however, is not practical in and of itself, in that it does not provide sufficient support for components of the articulated off-road vehicle 10 in comparison to that provided by a conventional non-articulating type vehicle chassis. Hence, the articulated off-road vehicle 10 also includes a front suspension assembly 40 as can counter a tendency of the front chassis section 22 from pivoting upwardly, such as when the articulated off-road vehicle 10 is at rest or traversing obstructions, and to assist in providing concurrent absorption of impact or a reduction in a magnitude of energy transfer forces from an impact acting on the articulated off-road vehicle 10.

Figure 4:
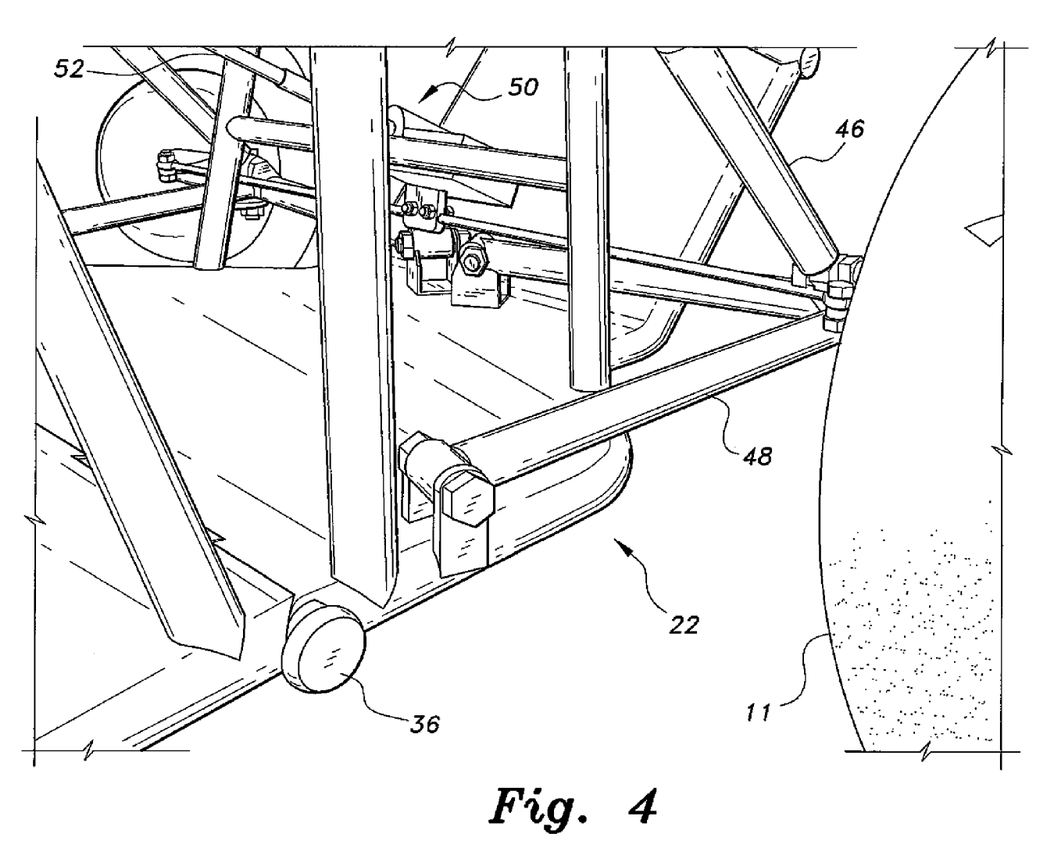
FIG. 4 is a detailed perspective view of an embodiment of the front suspension configuration in an embodiment of the articulated off-road vehicle shown in FIG. 1 according to the present invention.

A typical vehicle frame usually includes front pillars as, for example, the elongate frame members that define the sides of a windshield, which are typically of fixed length and non-movable. In contrast, embodiments of an articulated off-road vehicle, such as the articulated off-road vehicle 10, include the front suspension assembly 40. The front suspension assembly 40 includes a pair of an elongate first shock absorber or suspension member 42 and an elongate second shock absorber or suspension member 44 each extending from the top corners of the of the upper frame 13 towards the respective front wheel 11 mounted to a corresponding side of the front chassis section 22. Each of the first and second shock absorbers 42 and 44 is respectively pivotally mounted at one end to the upper frame 13 and pivotally mounted in communication with the respective wheel 11 at the opposite end, for example. Thus, the first and second shock absorbers 42 and 44 function as variable length pillars, replacing the front pillars of the typical non-articulated vehicle frame to enable providing a relatively sufficient concurrent absorption of impact and reduction in a magnitude of energy transfer forces resulting from such impact, for example.

In an embodiment of the articulated off-road vehicle 10, each shock absorber 42 and 44 can include an elongate upper cylinder 45 and an elongate lower cylinder 46 with one of the cylinders being reciprocally movable within the other, for example. In this instance the upper cylinder 45 has a larger diameter than the lower cylinder 46, and the lower cylinder 46 reciprocates with respect to the upper cylinder 45, for example. The dampening effect of each of the first shock absorber 42 and the second shock absorber 44 can be provided by various means known in the art, such as springs, gas, or a combination thereof, and should not be construed in a limiting sense.

The dampening as can be provided by the first shock absorber 42 and the second shock absorber 44 can vary, such as by using a type of shock absorber having a range or degree of stiffness corresponding to a hardness or softness level or by using an adjustable type of shock absorber that can be adjusted, such as by a user of the articulated off-road vehicle 10 to provide varying degrees or amounts of stiffness, such as from relatively hard to relatively soft, such as can be based on the desires and needs of the driver D or user, or as can depend on the particular environment, use or application for the articulated off-road vehicle 10, for example. In this regard, the intended terrain to be traversed by the articulated off-road vehicle 10 can also be considered in determining the most suitable dampening required or desired, for example.

Also, in rocky terrain, a desirable dampening can be relatively soft so as to substantially prevent or minimize the articulated off-road vehicle 10 from bouncing overtly during movement. In other terrain, such as a desert with rolling dunes, the hills and valleys are relatively far apart and deep in some parts, and in such situations, the dampening can be configured to be relatively stiff to better absorb the harsher impacts when speeding over a dune, for example.

When assembled, the front suspension assembly 40 and the front chassis section 22 can desirably form a generally triangular cantilever sub-frame with pivot points at the at least one hinge joint 30, at the upper frame 13, and at the front chassis section 22 in the area of the one or more front wheels 11. During traversal of rough terrain, the geometry of the sub-frame is enabled to constantly or substantially constantly, or within a relatively short time period, change in reaction to the bumps and dips along the path of travel facilitated by the extension and retraction of the first and second shock absorbers 42 and 44 as the front chassis section 22 pivots about the at least one hinge joint 30.

For improved safety and comfort of the driver and occupants of the articulated off-road vehicle 10, the first and second shock absorbers 42 and 44 are relatively long, so that the throw of the shock absorbers 42 and 44 are also correspondingly relatively long to enhance shock absorption. Additionally, the pivoting of the front chassis section 22 can also alleviate a significant amount of the impact energy so that the impact energy is absorbed more by the shock absorbers 42 and 44 as opposed to the rest of the pivotable chassis 20 and/or the upper frame 13. However, such components in embodiments of the articulated off-road vehicle 10 can likely experience some of the impact energy during movement, but the impact energy experienced typically is not to the extent experienced by a non-articulated chassis, such as those utilized in most conventional vehicles.

Figure 2A:
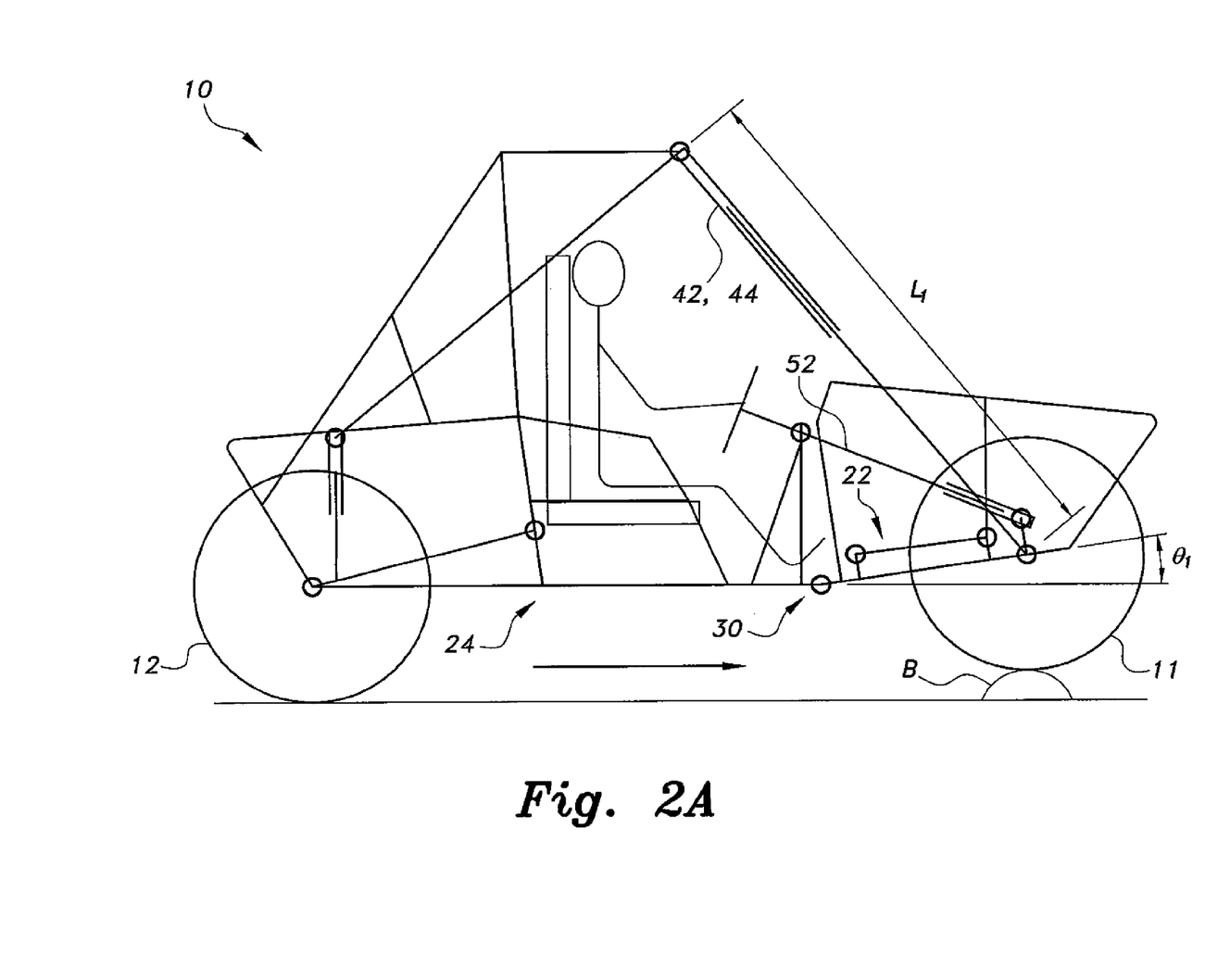
FIG. 2A is a schematic view of an embodiment of the articulated off-road vehicle shown in FIG. 1 depicting the articulation of the off-road vehicle when traversing an obstacle.
Figure 2B:
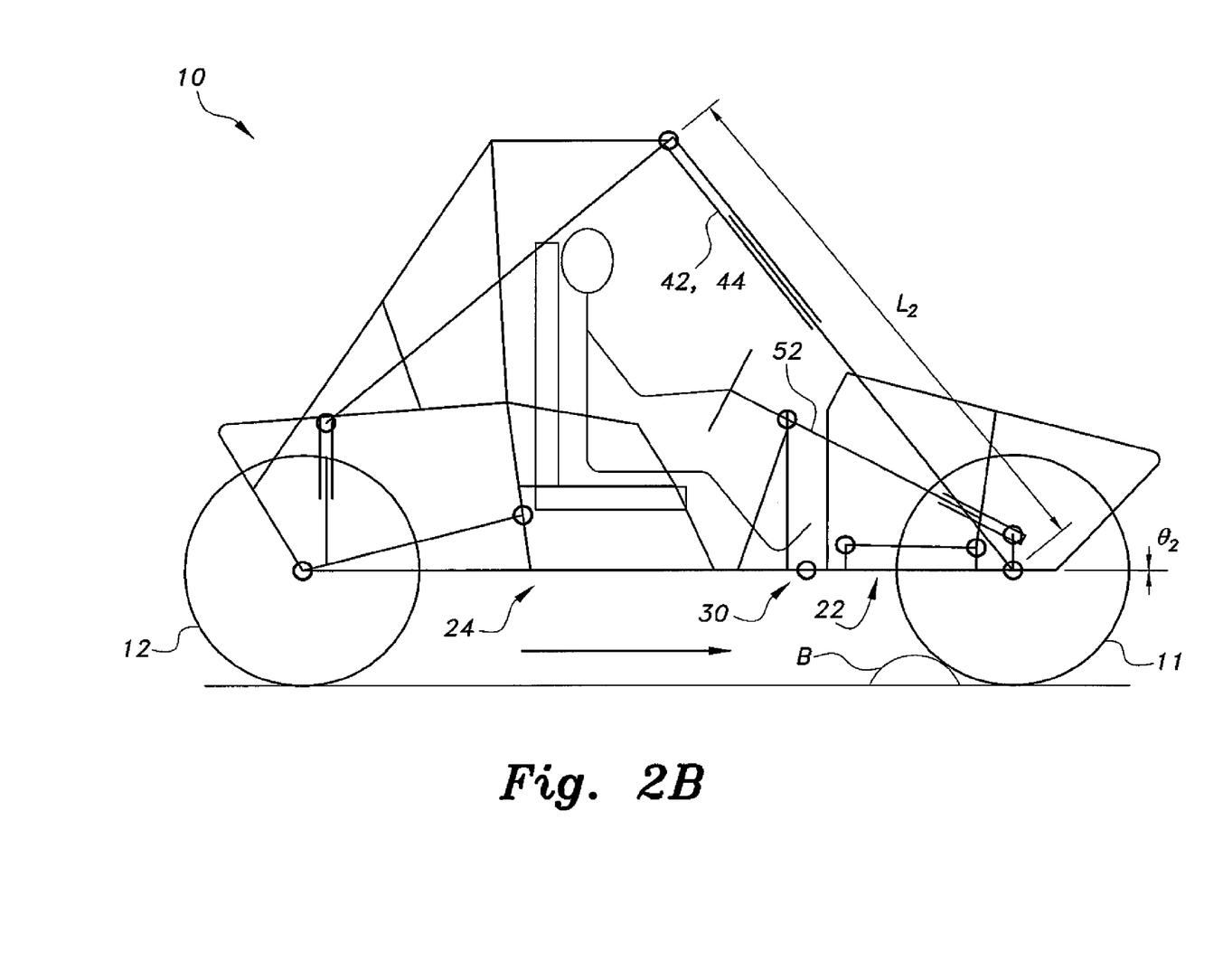
FIG. 2B is a schematic view of an embodiment of the articulated off-road vehicle shown in FIG. 1 depicting the off-road vehicle after traversing the obstacle.
Figure 2C:
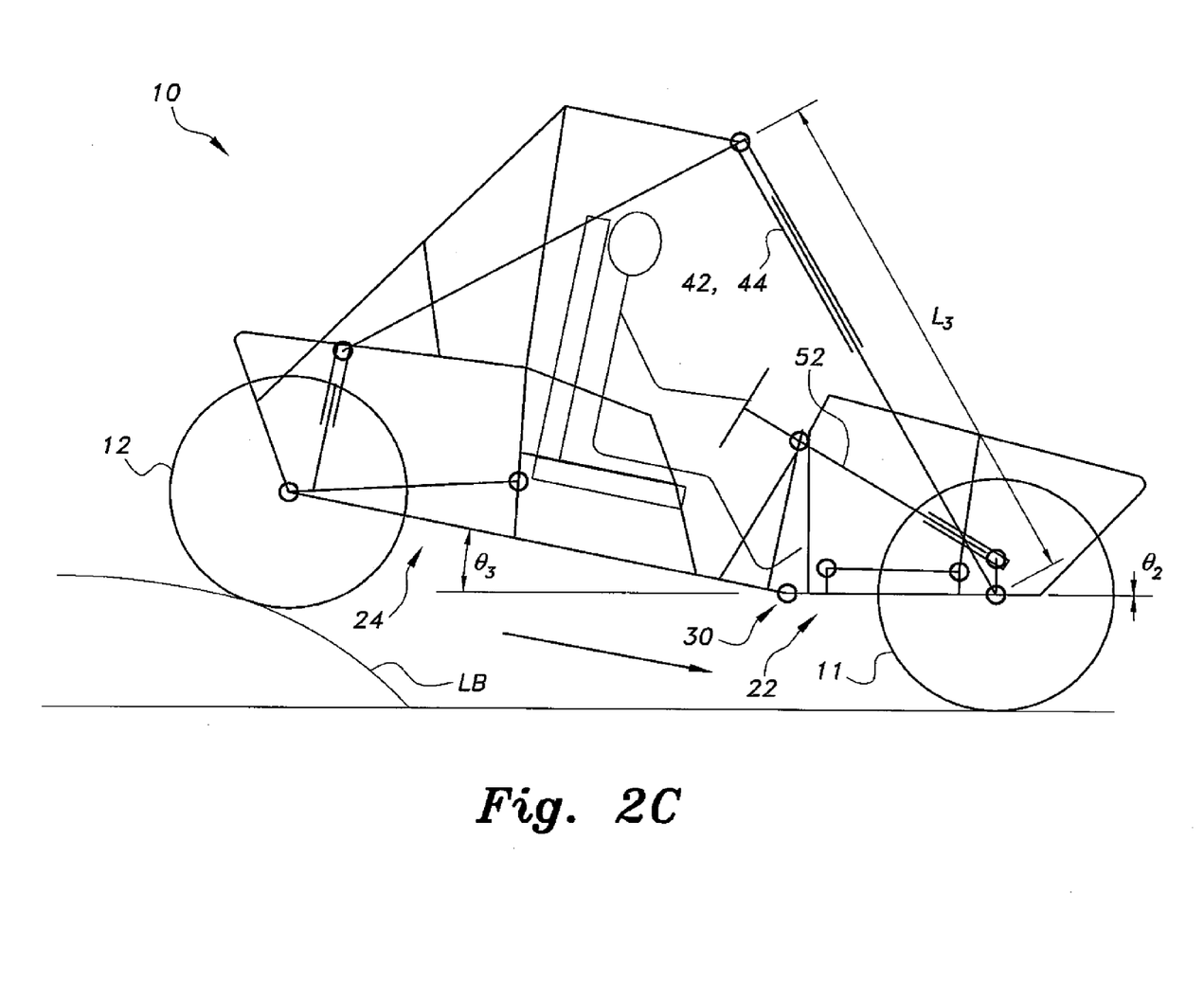
FIG. 2C is a schematic view of an embodiment of the articulated off-road vehicle shown in FIG. 1 depicting a landing position of the off-road vehicle after traversing a larger obstacle relative to the obstacles traversed shown in FIGS. 2A and 2B.

Referring now to FIGS. 2A-2C, the schematic views shown in FIGS. 2A-2C illustrate examples of the synergy between the pivotable chassis 20 and the front suspension assembly 40 as can assist in dissipating a relatively substantial amount of the potentially harmful impact forces that can cause injury or relatively significant discomfort to the occupants of the articulated off-road vehicle 10.

As shown in FIGS. 2A and 2B, when the articulated off-road vehicle 10 encounters a bump or obstruction B, the front chassis section 22 pivots upwardly to or in a range of a certain angle $\theta_1$ and the front suspension assembly 40 retracts to absorb the impact. By comparing FIGS. 2A and 2B, it can be seen that the retracted length $L_1$ of the shock absorbers 42 and 44 is typically shorter than at a normal length $L_2$ shown in FIG. 2B. Moreover, the normal angle $\theta_2$ with respect to the surface being traversed is approximately zero degrees, since the front chassis section 22 would be about level with the rear chassis section 24 at that point. It is to be understood that the term "normal" as used herein simply refers to the general condition of the affected components when the articulated off-road vehicle 10 is stationary or moving over a relatively smooth surface. The shock absorbers 42 and 44 will extend and retract in response to corresponding pivoting movements of the front chassis section 22 as the front chassis section 22 encounters irregularities on the surface of the path or terrain being traversed. The combined action of the pivotable chassis 20 and the front suspension assembly 40 can therefore more effectively dissipate the impact energy compared to a chassis, such as a non-articulated type chassis, that likely cannot substantially give in response to such forces, especially at relatively high speeds in rough terrain, for example.

The above type of impact illustrated in FIGS. 2A and 2B, is likely not necessarily as harmful or is likely not necessarily to cause a relative amount of discomfort as a type of impact of a next stage shown in FIG. 2C, since the bump illustrated and described in FIGS. 2A and 2B is relatively small, for example. However, as illustrated in FIG. 2C, when the articulated off-road vehicle 10 sails over a relatively larger bump LB, such as some desert dunes, the landing impact can be especially brutal or discomforting to the occupants, enough so that the one or more occupants can potentially experience, or increase the likelihood of experiencing, a whiplash type injury, or other jarring type injury, for example.

In order to avoid or substantially minimize such an occurrence of a whiplash or other jarring type injury, in embodiments of the articulated off-road vehicle 10 the pivoting of the first chassis section 22 and the relatively long throw of the shock absorbers 42 and 44 can provide relatively more time and distance for energy dampening to minimize the likelihood of occurrence of such injury, for example. In the more extreme example shown in FIG. 2C, it can be seen that at the point of impact, the front chassis section 22 can be approximately level with the surface being traversed, as represented by the angle $\theta_2$, but the rear chassis section 24 can still be in contact with the large bump LB. This causes the rear chassis section 24 to pivot about the at least one pivotable joint, such as the at least one hinge joint 30, as represented by the angle $\theta_3$, which in turn, causes the shock absorbers 42 and 44 to retract to a retracted length $L_3$. The retracted length $L_3$ will be shorter than the normal length $L_2$. It is to be noted that while the exemplary depictions in FIGS. 2A-2C show general upward pivoting movement of the front chassis section 22 and/or the rear chassis section 24, both the front chassis section 22 and the rear chassis section 24 can also pivot downward with respect to each other.

In an embodiment of the articulated off-road vehicle 10, the front chassis section 22 is desirably about a third the length of the pivotable chassis 20, but other relative lengths the front chassis section 22 can be used, such as can depend on the use or application, and should not be construed in a limiting sense. This relative length of about a third the length of the pivotable chassis 20 is typically desirable enough to house and support the steering assembly mechanism 50 and A-arms 48 that typically can connect directly to or are coupled to the one or more front wheels 11, such as illustrated in FIGS. 4 and 5, for example. Each A-arm 48 is pivotable in generally the vertical direction to facilitate the vertical movement of the one or more front wheels 11 as they traverse over bumps and dips, for example.

The operating pedals P are desirably placed near the front of the rear chassis section 24 so that they are substantially removed from the pivoting movement of the front chassis section 22, such as illustrated in FIG. 1, for example. If the operating pedals P are disposed in the front chassis section 22, proper driver control of the articulated off-road vehicle 10 can potentially be compromised during operation. For example, as the front chassis section 22 pivots upward from a bump, the driver's foot may still be on one of the pedals P causing the articulated off-road vehicle 10 to accidentally or unintentionally accelerate faster, brake harder or engage a clutch depending on which pedal P the driver D is engaged at the time. Any of those instances can possibly lead to a loss of control as can increase a likelihood of potential accidents, for example.

The articulated off-road vehicle 10 can include additional features to enhance vehicle control during the relatively rough portions of travel of terrain or a road. For example, the steering column 52 can be configured as a telescoping column, such as diagrammatically illustrated in FIGS. 2A-2C, with integral dampening via operative use of springs, gases, and the like to compensate for the pivoting movement of the front chassis section 22 and to assist in preventing or minimizing the potential chance of the steering column 52 hitting the driver D during instances of an extreme impact, for example.

Thus, it can be seen that the articulated off-road vehicle 10 can provide very efficient and effective dampening of impact forces that can help minimize some of the harmful effects thereof. The pivotable chassis 20 permits the articulated off-road vehicle 10 to better conform to the contours of the terrain being traversed while providing a non-rigid framework that can adapt to the impact forces acting thereon.

It is to be understood that the present invention is not limited to the embodiments described above, but encompasses any and all embodiments within the scope of the following claims.

I claim:

1. A frame assembly for an off-road vehicle, comprising:
   an elongate, pivotable chassis, the pivotable chassis having a front chassis section, a rear chassis section, and at least one pivotable joint pivotally coupling the front chassis section with the rear chassis section to move the front chassis section relative to the rear chassis section;
   wherein the front chassis section extends at least about a third of the length of the pivotable chassis;
   an upper frame extending upwardly from the pivotable chassis, the upper frame adapted to provide a compartment for a user and for components of the off-road vehicle, the upper frame having a top; and
   a suspension assembly extending at an angle between the upper frame and the front chassis section, the suspension assembly being pivotally coupled to the top of the upper frame at one end and pivotally coupled to the front chassis section at an opposite end, the suspension assembly adapted to dissipate impact energy acting thereon and to adjust a length thereof between extended and retracted positions in reaction to corresponding movement of at least the front chassis section, the suspension assembly forming substantially elongate, variable length front pillars of the frame assembly;
   wherein the front chassis section has an angular motion in a direction upward from a terrain surface.

2. The frame assembly for an off-road vehicle according to claim 1, wherein the at least one pivotable joint comprises at least one hinge joint.

3. The frame assembly for an off-road vehicle according to claim 2, wherein the at least one hinge joint comprises:
   a front knuckle disposed on one end of the front chassis section and a rear knuckle disposed on one end of the rear chassis section, the front knuckle and the rear knuckle being intermeshed with each other; and
   an elongate hinge pin slidably inserted through the intermeshed front knuckle and rear knuckle.

4. The frame assembly for an off-road vehicle according to claim 1, wherein the suspension assembly comprises:
   a pair of elongate shock absorbers, each shock absorber extending at an angle between a top corner of the upper frame and a corresponding side of the front chassis section, each shock absorber having one end pivotally mounted to the respective top corner and the other end pivotally mounted to the front chassis section.

5. The frame assembly for an off-road vehicle according to claim 4, wherein each shock absorber comprises:
   an elongate upper cylinder having one end pivotally coupled to a corresponding top corner of the upper frame and an elongate lower cylinder having one end pivotally coupled to the front chassis section, one of the upper cylinder and lower cylinder reciprocating within the other.

6. The frame assembly for an off-road vehicle according to claim 5, wherein the at least one pivotable joint comprises at least one hinge joint.

7. The frame assembly for an off-road vehicle according to claim 6, wherein the at least one hinge joint comprises:
   a front knuckle disposed on one end of the front chassis section and a rear knuckle disposed on one end of the rear chassis section, the front knuckle and the rear knuckle being intermeshed with each other; and
   an elongate hinge pin slidably inserted through the intermeshed front knuckle and rear knuckle.

8. An articulated off-road vehicle, comprising:
   an elongate, pivotable chassis, the chassis having a front chassis section, a rear chassis section, and at least one pivotable joint pivotally coupling the front chassis section with the rear chassis section to move the front chassis section relative to the rear chassis section;
   wherein the front chassis section extends at least about a third of the length of the pivotable chassis;
   at least one front wheel coupled to the front chassis section;
   at least one rear wheel coupled to the rear chassis section;
   an upper frame extending upwardly from the pivotable chassis, the upper frame adapted to provide a compartment for at least one user and for components of the off-road vehicle, the upper frame having a top;
   an engine coupled to the rear chassis section;
   a steering assembly mounted to the front chassis section; and
   a suspension assembly extending at an angle between the upper frame and the front chassis section, the suspension assembly being pivotally coupled to the top of the upper frame at one end and pivotally coupled to the front chassis section at an opposite end, the suspension assembly adapted to dissipate impact energy acting thereon and to adjust a length thereof between extended and retracted positions in reaction to corresponding movement of at least the front chassis section, the suspension assembly forming substantially elongate, variable length front pillars of a frame assembly of the articulated off-road vehicle,
   wherein at least the front chassis section pivots and the suspension assembly concurrently reacts to changes in a terrain to absorb impact forces to substantially minimize the impact forces on the at least one user of the articulated off-road vehicle, and wherein the front chassis section has an angular motion in a direction upward from the terrain.

9. The articulated off-road vehicle according to claim 8, wherein the at least one pivotable joint comprises at least one hinge joint.

10. The articulated off-road vehicle according to claim 9, wherein the at least one hinge joint comprises:
    a front knuckle disposed on one end of the front chassis section and a rear knuckle disposed on one end of the rear chassis section, the front knuckle and the rear knuckle being intermeshed with each other; and an elongate hinge pin slidably inserted through the intermeshed front knuckle and rear knuckle.

11. The articulated off-road vehicle according to claim 8, wherein the suspension assembly comprises:

a pair of elongate shock absorbers, each shock absorber extending at an angle between a top corner of the upper frame and a corresponding side of the front chassis section, each shock absorber having one end pivotally mounted to the respective top corner and the other end pivotally mounted to the front chassis section.

12. The articulated off-road vehicle according to claim 11, wherein each shock absorber comprises:

an elongate upper cylinder having one end pivotally coupled to a corresponding top corner of the upper frame and an elongate lower cylinder having one end pivotally coupled to the front chassis section, one of the upper cylinder and lower cylinder reciprocating within the other.

13. The articulated off-road vehicle according to claim 12, wherein the at least one pivotable joint comprises at least one hinge joint.

14. The articulated off-road vehicle according to claim 13, wherein the at least one hinge joint comprises:

a front knuckle disposed on one end of the front chassis section and a rear knuckle disposed on one end of the rear chassis section, the front knuckle and the rear knuckle being intermeshed with each other; and an elongate hinge pin slidably inserted through the intermeshed front knuckle and rear knuckle.

* * * * *